US009550687B2

(12) United States Patent
Grabowski et al.

(10) Patent No.: US 9,550,687 B2
(45) Date of Patent: Jan. 24, 2017

(54) ELECTRODEIONIZATION MODULE AND APPARATUS

(71) Applicant: MERCK PATENT GMBH, Darmstadt (DE)

(72) Inventors: Andrej Grabowski, Buc (FR); Julien Gross, Elancourt (FR)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/424,934

(22) PCT Filed: Jul. 25, 2013

(86) PCT No.: PCT/EP2013/002205
§ 371 (c)(1),
(2) Date: Feb. 27, 2015

(87) PCT Pub. No.: WO2014/032751
PCT Pub. Date: Mar. 6, 2014

(65) Prior Publication Data
US 2015/0225267 A1  Aug. 13, 2015

(30) Foreign Application Priority Data

Aug. 27, 2012  (EP) .................................... 12290283

(51) Int. Cl.
*B01D 61/48* (2006.01)
*C02F 1/469* (2006.01)
*C02F 1/32* (2006.01)
*C02F 1/44* (2006.01)
*C02F 103/04* (2006.01)

(52) U.S. Cl.
CPC .............. *C02F 1/4695* (2013.01); *B01D 61/48* (2013.01); *B01D 61/485* (2013.01); *B01D 2325/42* (2013.01); *C02F 1/32* (2013.01); *C02F 1/441* (2013.01); *C02F 1/442* (2013.01); *C02F 2103/04* (2013.01); *C02F 2201/46* (2013.01); *C02F 2303/16* (2013.01)

(58) Field of Classification Search
USPC ...................................................... 204/524
See application file for complete search history.

(56) References Cited

U.S. PATENT DOCUMENTS

| 4,033,850 | A | 7/1977 | Kedem et al. |
| 4,308,467 | A | 12/1981 | Kolluri et al. |
| 4,992,407 | A | 2/1991 | Chakraborty et al. |

(Continued)

FOREIGN PATENT DOCUMENTS

| EP | 0358912 B1 | 3/1990 |
| EP | 0416140 B1 | 3/1991 |

(Continued)

OTHER PUBLICATIONS

International Search Report for PCT/EP2013/002205 dated Sep. 30, 2013.

(Continued)

*Primary Examiner* — Arun S Phasge
(74) *Attorney, Agent, or Firm* — Millen White Zelano & Branigan, P.C.

(57) ABSTRACT

The present invention relates to an improved electrodeionization (EDI) module and apparatus adapted to transfer ions present in a liquid under the influence of an electric field.

14 Claims, 9 Drawing Sheets

(56) References Cited

U.S. PATENT DOCUMENTS

| | | |
|---|---|---|
| 5,308,467 A | 5/1994 | Sugo |
| 5,425,866 A | 6/1995 | Sugo et al. |
| 5,453,185 A | 9/1995 | Frechet et al. |
| 5,738,775 A | 4/1998 | Nagai et al. |
| 6,423,205 B1 | 7/2002 | Akahori et al. |
| 6,436,264 B1 | 8/2002 | Tamura |
| 6,495,014 B1 | 12/2002 | Datta et al. |
| 6,610,546 B1 | 8/2003 | Liu et al. |
| 2002/0139676 A1 | 10/2002 | Moulin et al. |
| 2004/0188258 A1* | 9/2004 | Takahashi ........... B01D 61/44 204/631 |
| 2006/0091013 A1 | 5/2006 | Takahashi et al. |

FOREIGN PATENT DOCUMENTS

| | | |
|---|---|---|
| EP | 1282463 B1 | 2/2003 |
| GB | 776469 A | 6/1957 |
| JP | 7100391 A | 4/1995 |
| JP | 2008012774 A | 1/2008 |
| WO | 9511741 A1 | 5/1995 |
| WO | 2005011849 A | 2/2005 |

OTHER PUBLICATIONS

Inoue, H. et al., Synthesis and cation exchange properties of a new porous cation exchange resin having an open-celled monolith structure, Polymer, 2004, vol. 45, pp. 3-7.

Soldatov, V. S. et al., "Syntheses and the Main Properties of Fiban Fibrous Ion Exchangers," Solvent Extraction and Ion Exchange, 2008, vol. 26, pp. 457-513.

Lilja, J. et al., "Kinetics of esterification of propanoic acid with methanol over a fibrous polymer-supported sulphonic acid catalyst," Applied Catalysis A, 2002, vol. General 228, pp. 253-267.

Yeon, K. et al., "Preparation and Characterization of Cation-Exchange Media Based on Flexible Plyurethan Foams," Journal of Applied Polymer Science, 2002, vol. 86, pp. 1773-1781.

English language Abstract of JP7100391A published on Apr. 18, 1995 to Ebara Corp.

English machine translation of JP2008012774 published on Jan. 24, 2008 to Mitsubishi Paper Mills Ltd.

* cited by examiner

ELECTRODEIONIZATION MODULE AND APPARATUS

FIELD OF THE INVENTION

The present invention relates to an improved electrodeionization (EDI) module and apparatus adapted to transfer ions present in a liquid under the influence of an electric field. Specifically, the invention relates to an EDI apparatus adapted to purify aqueous liquids for the production of water of high purity or ultra-pure water and a method for purifying a liquid. The present invention further relates to a laboratory water purification system utilizing the EDI module or apparatus.

BACKGROUND OF THE INVENTION

Electrodeionization (EDI) is a process for removing ions from liquids, such as water, by sorption of these ions to a material capable of exchanging these ions either for hydrogen ions (for cations) or hydroxide ions (for anions) and removal of the sorbed ions by the application of an electric field between an anode and a cathode.

A typical EDI module has at least one diluate compartment through which the liquid to be processed is passed and at least one concentrate compartment taking up the ions removed from the liquid in the diluate compartment. The diluate compartment is therefore often also called "product channel" and the concentrate compartment is therefore often also called "waste channel".

At the outer edge of one side of the diluate compartment there is typically an anion permeable membrane which defines the outer limit of the diluate compartment on that side. The outer limit on the opposite side of the diluate compartment is typically defined by a cation permeable membrane. One or more concentrate compartments are formed on the opposite sides of the membranes from the diluate compartment. In particular, concentrate compartments are typically formed between the anion permeable membrane from the cathode side and the cation permeable membrane from the anode side. An anode side compartment (also called anode compartment) and a cathode side compartment (also called cathode compartment) is a compartment containing the anode or the cathode, respectively, and delimited by a membrane. Depending on type of membranes delimiting an electrode compartment (and type of neighbor compartment) the electrode compartment acts for decationization, or deanionization or concentration of an acid or a base. Thus, typically an anode compartment delimited by an anion permeable membrane concentrates an acid, while an anode compartment delimited by a cation permeable membrane becomes depleted in salt cations. Likewise, a cathode compartment delimited by a cation permeable membrane concentrates a base, while a cathode compartment delimited by an anion permeable membrane becomes depleted in salt anions.

The diluate compartment is filled with ion-exchange materials through which the water to be deionized flows. The ion-exchange materials in the diluate compartment selectively sorb the ions from the liquid upon exchange for hydrogen ions (for cations) or hydroxide ions (for anions). By the applied electric field, the sorbed anions are transferred towards the anode and the sorbed cations are transferred towards the cathode. Once they pass through the respective ion permeable membranes, they are passed into the concentrate compartment. The concentrate compartments may be filled with ion-exchange material or with inert liquid permeable material and a liquid flows through each concentrate compartment to thereby rinse it and transport the ions to waste.

The ion-exchange material employed in EDI modules is often made of polymer resin in the form of polymer beads, as described for instance in EP 1 282 463 B1. Alternative ion-exchange materials have been produced in the form of nonwoven or woven fabrics made of fibers that contain anion-exchange and cation-exchange functional groups, as described for instance in U.S. Pat. No. 6,423,205 and US 2006/0091013. A combination of ion-exchange resin beads and fabrics is described in WO 2005/011849 A.

Ion-exchange materials in the form of nonwoven or woven fabrics or porous blocks allow intensifying the purification process and porous blocks further allow simplifying the assembly of the modules. Such materials are typically produced by grafting of porous or fibrous substrate followed by chemical treatment thereby introducing ion-exchange functionality to the material. In the following, they are also simply called "grafted materials".

Grafted materials allow further possibilities of special arrangements of ion-exchange materials inside compartments of an EDI module, which are hardly possible with a bed of ion-exchange resin beads.

Regarding the construction of a diluate compartment in EDI, the patent application JP 07-100391 A describes layers of ion-exchange nonwoven fabrics arranged in parallel with liquid flow, adjacent to a membrane of the same polarity and separated by a neutral open mesh screen, while in U.S. Pat. No. 6,423,205 the screen is supposed to have ion-exchange capacity. In case an ion-exchange screen is used, the water dissociation is electrochemically enhanced at the bipolar interface between the grafted materials oriented perpendicular to the electric field, and the generated $H^+$ and $OH^-$ ions regenerate grafted materials and can be exchanged for ionic or ionizable contaminants thereby removed from water. In the EDI apparatus, as disclosed in FIG. 3 of U.S. Pat. No. 6,423,205, all layers are oriented parallel to the membranes and the liquid flow, the fibrous materials increase the active surface for ion removal, but since they exhibit resistance to flow compared to the open mesh screen, most of the flow streams through the channel between the fibrous materials filled by screen. In this case a long flow path is required to purify water to high resistivity. Together with the fact that compartments with layers parallel to membranes are relatively thin, e.g. 3 mm-5 mm, the assembly will require a relatively high membrane area per volume of water produced and result in relatively high material cost.

An improvement was disclosed in US 2006/0091013 where the layers of grafted materials are positioned perpendicular to the membranes and to the flow direction, as shown in FIG. 2 of US 2006/0091013. In this case thicker compartments can be used that reduces the pressure drop and material cost. Since all water can pass through the fibrous materials with high specific surface area, the ions should be removed efficiently in a relatively short path, which results in very good purification performance. The authors of US 2006/0091013 state that for achieving excellent purification performance it is important that water passes alternatively many times through the contacts between cation- and anion-exchange materials, typically 10 contacts between counterpolar layers of grafted materials per 1 cm of diluate channel length, which requires a complex equipment or extensive labor for cutting the layers and assembling the modules.

The electrochemically enhanced water dissociation with generation of $H^+$ and $OH^-$ ions required for regeneration of grafted materials substantially occurs at the interface between grafted material and a counter-polar membrane, as illustrated in FIG. 5. The water dissociation could be enhanced on the interface between adjacent layers of grafted materials, but the orientation of the layers parallel to the electric field is not favored for this. Here an electrochemically enhanced water dissociation can occur due to a certain "roughness" of the interface between two fibrous materials and due to a deviation of the electric field lines from the parallel orientation between the electrodes, e.g. caused by different conductivities of materials over the length of the module. It is considered that the regeneration of materials with such orientation in the electric field may require a relatively high potential drop to be applied and may result in a relatively low energy efficiency for the deionization process.

As a further disadvantage of the technique described in US 2006/0091013, due to the orientation in a plurality of thin layers where $H^+$ and $OH^-$ ions are migrating in opposite directions, some of them can be driven by concentration difference to the interface between the counterpolar layers where they will recombine to water and thus will not be available for exchange with ionic and ionizable contaminants from water. In a similar way the salt ions, which are already removed from water and migrate inside corresponding ion-exchange material can recombine on the interface between counterpolar grafted materials and thus be rejected back into water, thereby decreasing the current efficiency of the purification process. The decrease of current efficiency through the recombination of $H^+$ and $OH^-$ ions to water and the rejection of removed salt anions and cations into water of the diluate compartment will be pronounced even stronger with an increase of the compartment thickness. Moreover, a considerable amount of the ions generated at the membrane/grafted material interface immediately pass through the corresponding membrane ($H^+$ ion through the cation permeable membrane and $OH^-$ ion through the anion permeable membrane) and are forwarded directly into the respective concentrate compartment without participating in the regeneration of grafted materials. This further decreases the current efficiency and provokes strong local pH variations on the surface of the corresponding membrane in the concentrate compartment, which might be unwished due to the risk of scaling formation or materials degradation.

Object Of The Invention

An object of the present invention is to provide an EDI module benefiting from the advantages of flow-through ion-exchange materials in terms of an intensified purification process and enabling special arrangements of ion-exchange materials, which do however not suffer from the above-described drawbacks of the known EDI modules and apparatuses with regard to complexity of manufacturing and assembly of the modules, the flow-through channels between the ion-exchange material without sufficient interaction with the ion-exchange material and a decreased current efficiency.

A further object of the present invention is to provide an EDI apparatus which enables the purification of aqueous liquids for the production of water of high purity or ultra-pure water with unprecedented efficiency and at low costs of both manufacture and operation as well as a method for purifying a liquid, in particular water, with unprecedented efficiency and at low costs of operation and maintenance.

Still another object of the present invention is to provide a laboratory water purification system which can be readily used in a laboratory and provides purified water on demand.

SUMMARY OF THE INVENTION

The present invention relates to an electrodeionization (EDI) module comprising a cathode and an anode spaced apart from the cathode, having therebetween at least two ion permeable membranes comprising at least one anion permeable membrane and at least one cation permeable membrane and delimiting one or more diluate compartments and one or more concentrate compartments, wherein at least one diluate compartment contains at least two blocks, a first block containing anion-exchange material and a second block containing cation-exchange material, wherein a surface of said first block is adjacent to an anion permeable membrane and a surface of said second block is adjacent to a cation permeable membrane and wherein said two blocks are arranged side by side in a liquid-passing direction thereby forming an interface between said two blocks such that said interface is spaced apart from said anion permeable membrane and said cation permeable membrane and a straight line in a liquid-passing direction may pass the interface between said two blocks at least one time.

The present invention further relates to an EDI module comprising a cathode and an anode spaced apart from the cathode, having therebetween at least two ion permeable membranes comprising at least one anion permeable membrane and at least one cation permeable membrane and delimiting one or more diluate compartments and one or more concentrate compartments, wherein at least one diluate compartment contains at least two blocks, a first block containing anion-exchange material and a second block containing cation-exchange material, wherein a surface of said first block is adjacent to an anion permeable membrane and a surface of said second block is adjacent to a cation permeable membrane and wherein said two blocks are arranged side by side in a liquid-passing direction thereby forming an interface between said two blocks such that said interface is spaced apart from said anion permeable membrane and said cation permeable membrane and wherein said first block and said second block have complementary protrusions and recesses at said interface extending transverse to the liquid-passing direction.

The present inventors have found that a special shape and orientation of the flow-through ion-exchange material inside a diluate compartment of an EDI module overcomes the drawbacks of the above-described prior art arrangements, i.e. improves the product liquid quality for a given volume of flow-through ion-exchange material and membrane area as well as increases the current efficiency, thereby improving the purification performance and ease of assembly compared with the layered grafted materials in parallel or perpendicular to the ion permeable membranes and the liquid flow.

The present invention further relates to an electrodeionization (EDI) apparatus for production of high-purity water or for production of ultra-pure water, comprising an EDI module according to the present invention.

The present invention further relates to a laboratory water purification system, comprising an EDI module or an EDI apparatus according to the present invention.

The present invention further relates to a method for purifying a liquid, utilizing an EDI module according to the present invention, an EDI apparatus according to the present invention or a laboratory water purification system according to the present invention, the method comprising the steps of feeding the liquid to be purified into said at least one diluate compartment, passing the liquid to be purified through said at least one diluate compartment under application of an electric field, and collecting the purified liquid at an outlet of said at least one diluate compartment.

DETAILED DESCRIPTION OF THE INVENTION

Hereinafter, details of the present invention and other features and advantages thereof will be described. However, the present invention is not limited to the following specific descriptions and embodiments, but they are rather for illustrative purposes only.

Figure 1:
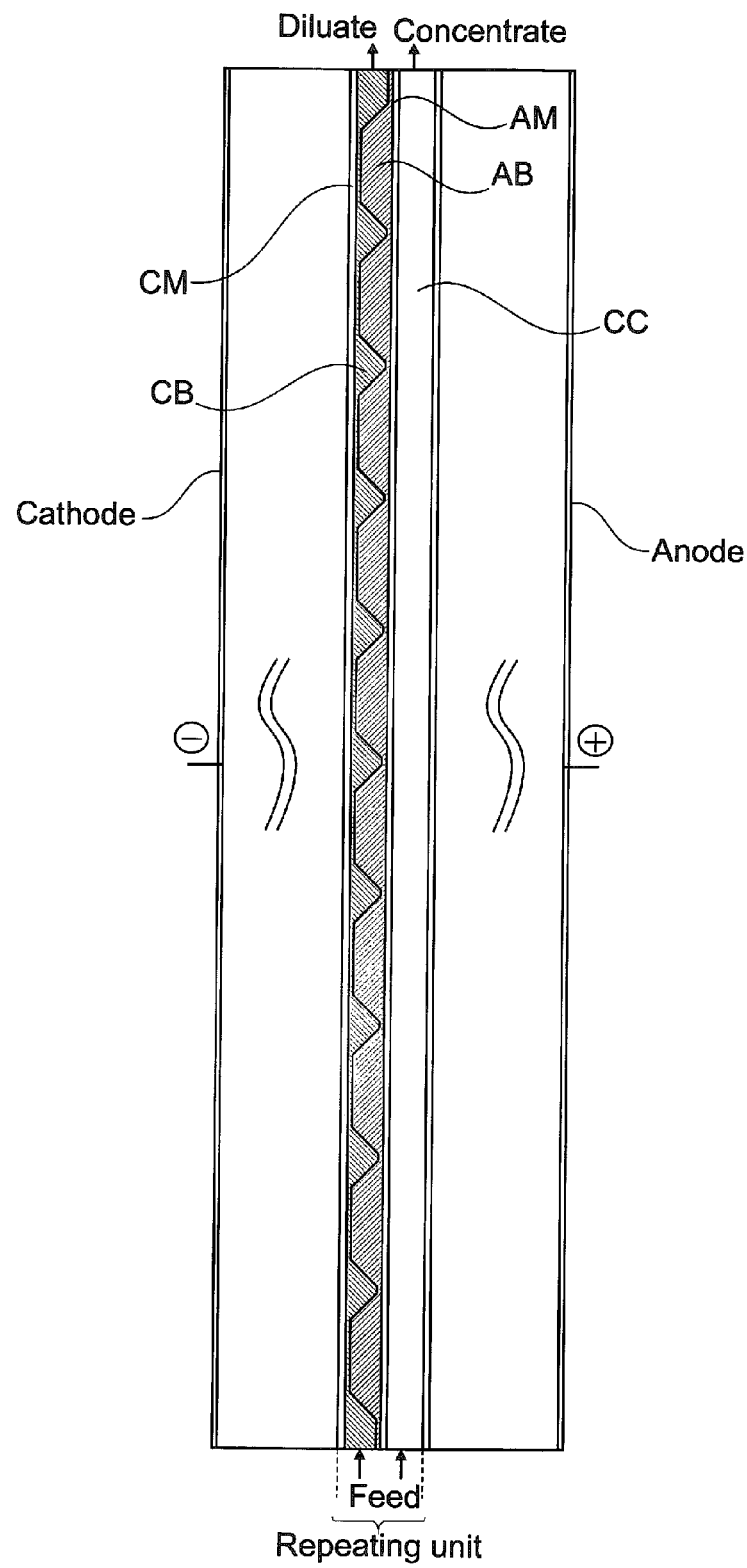
FIG. 1 is a schematic illustration of an exemplary embodiment of an EDI module according to the present invention.
Figure 2:
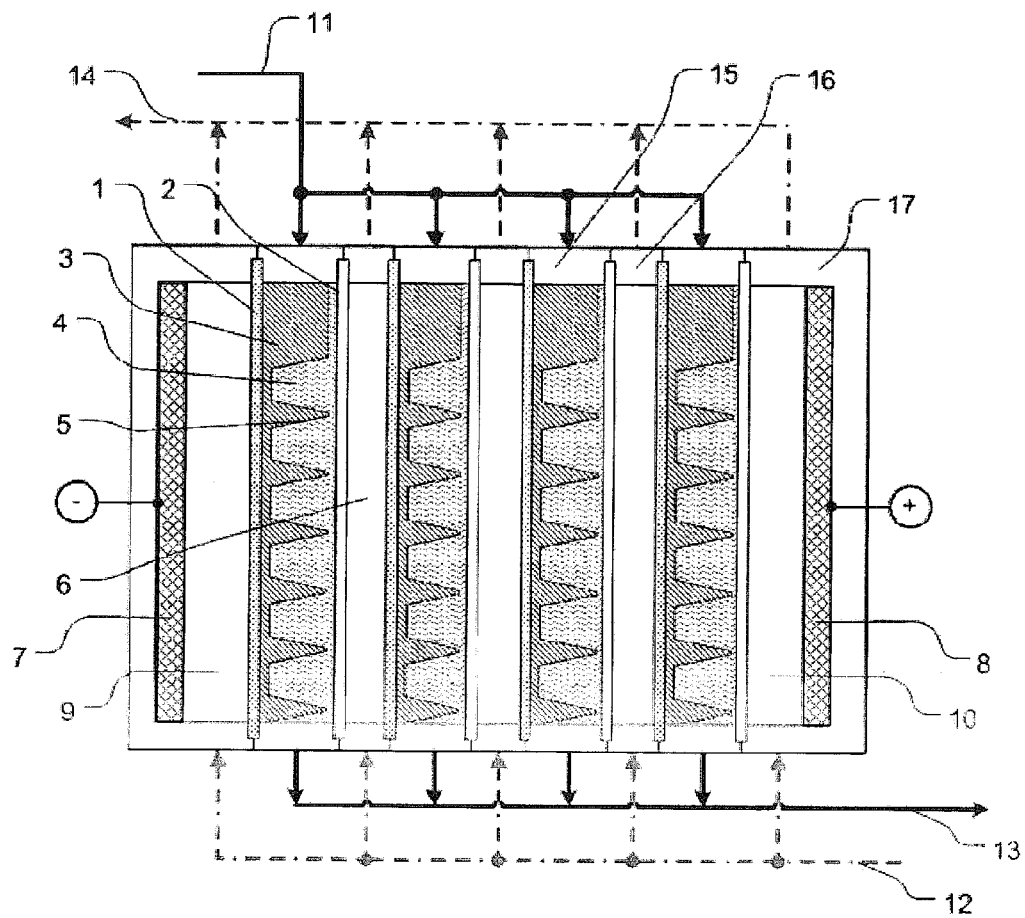
FIG. 2 is a schematic illustration of another exemplary embodiment of an EDI module according to the present invention, particularly comprising four repeating units, each consisting of an adjacent concentrate compartment (6) and a diluate compartment (5), which is located between a cation-permeable membrane (1) and an anion-permeable membrane (2) and filled with cation-exchange block (3) and anion-exchange block (4). On the extremities the stack is accomplished by a cathode compartment (9) containing a cathode (7) and an anode compartment (10) containing an anode (8). Perimeter, sealing and inlet-outlet flow distributors for corresponding compartments are formed by diluate compartment frames (15), concentrate compartment frames (16), cathode and anode end-caps (17). The rinsing of corresponding compartments is shown in a simplified way, were directed for purification feed water stream (11), i.e. the feed to deionize, flows through diluate compartments, where it is deionized and exits as diluate stream (13) used as product, while the concentrate and electrode compartments are rinsed by stream (12), i.e. the feed to concentrate, exiting as concentrate stream (14) for waste or reutilization. Direct current is conducted between the electrodes (7) and (8) to regenerate ion-exchange blocks (3) and (4) of diluate compartments (5) and thus assure a continuous purification process.

FIGS. 1 and 2 illustrate exemplary embodiments of an electrodeionization (EDI) module according to the present invention.

The present invention provides an EDI module comprising a cathode and an anode spaced apart from the cathode, having therebetween at least two ion permeable membranes comprising at least one anion permeable membrane (AM) and at least one cation permeable membrane (CM) and delimiting one or more diluate compartments and one or more concentrate compartments (CC) and is characterized by a special shape and orientation of the flow-through ion-exchange material inside a diluate compartment.

The expression "comprising", as used herein, includes not only the meaning of "comprising" but also encompasses the meaning of "consisting essentially of" and "consisting of". Likewise, the expression "containing", as used herein, includes not only the meaning of "containing" but also encompasses the meaning of "made of" or "filled with".

The expressions "at least one" and "one or more", as used herein, includes a number of 1, 2, 3, 4, 5, 6, 7, 8, 9, 10 or more. The expressions "at least two" and "two or more", as used herein, includes a number of 2, 3, 4, 5, 6, 7, 8, 9, 10 or more.

The expression (A) "spaced apart from" (B), as used herein, denotes that the components (A) and (B) are not in direct contact with each other. The expression (A) "is adjacent to" (B), as used herein, denotes that the components (A) and (B) are in close proximity to each other and preferably that they are in direct contact with each other.

First, the method for purifying a liquid according to the present invention will be described, thereby also describing in further detail the components of the EDI module and apparatus according to the present invention.

The liquid to be purified according to the present invention is preferably an aqueous liquid, more preferably water. The expression "purified", as used herein, preferably denotes the removal of ions from the liquid, i.e. the liquid will be deionized.

The liquid to be purified is fed into a diluate compartment according to the present invention. Preferably, an open-mesh screen having preferably ion-exchange properties is placed between the aperture(s) of the inlet, or outlet, flow distributors of the compartment frame and the ion-exchange blocks of grafted material in the diluate compartment, thereby improving an even distribution of flow over the cross-section of the diluate compartment.

The diluate compartment contains or is preferably filled with a flow-through ion-exchange material according to the present invention that will be described in detail below. The flow-through ion-exchange material in the diluate compartment selectively sorbs the ions from the liquid upon exchange for hydrogen ions (for cations) or hydroxide ions (for anions). By the applied electric field between an anode and a cathode, the sorbed anions migrate towards the anode and the sorbed cations migrate towards the cathode.

The cathode and the anode, suitable for use in the present invention, are not particularly limited and any material and size customary in the field of EDI modules can be used.

Once the ions migrate through the respective ion permeable membranes, they enter the concentrate compartment.

The ion permeable membranes, suitable for use in the present invention, are not particularly limited and any material and size customary in the field of EDI modules can be used. As the name implies, the anion permeable membrane is permeable to anions and substantially impermeable to cations whereas the cation permeable membrane is permeable to cations and substantially impermeable to anions.

The ion permeable membranes serve to delimit a diluate compartment from a concentrate compartment. The ion permeable membranes allow the selective transfer of the respective ions from the diluate compartment to the concentrate compartment. In order to accelerate the transfer of the ions from the diluate compartment to the concentrate compartment, it is preferred that the ion permeable membranes themselves have ion-exchange properties, i.e. that the anion permeable membrane contains anion-exchange material and thereby represents an anion-exchange membrane and/or that the cation permeable membrane contains cation-exchange material and thereby represents a cation-exchange membrane.

A purging liquid flows through the concentrate compartment to thereby rinse the ions, removed from the liquid of the diluate compartment, into the concentrate stream. The liquid flow through the concentrate compartment may have the same direction as the liquid flow in the diluate compartment, as shown in FIG. 1, or it may be operated in a counterflow mode, as shown in FIG. 2. From the viewpoint of purification efficiency, it is preferred that the direction of the liquid flow through the concentrate compartment is opposite to the direction of the liquid flow through the diluate compartment, i.e. a counterflow mode operation. A part of the produced diluate, i.e. purified water, can be used to rinse adjacent concentrate compartments in a counterflow mode. If a pH decrease occurs in a compartment, which is often the case for an anode compartment or a concentrate compartment adjacent to the anode compartment, then it is preferable to use the water from this compartment to rinse in series other concentrate compartments and the cathode compartment thereby reducing the risk of a carbonate scaling in these other concentrate compartments and the cathode compartment.

If the electrode compartments are positioned vertically, it is preferable to rinse them upwards, i.e. from bottom to top, in order to effectively rinse gas bubbles generated on the electrodes.

The concentrate compartments may contain or are preferably filled with ion-exchange material or with inert liquid permeable material. It is also possible that the concentrate compartments contain or are filled with the flow-through ion-exchange material according to the present invention. From the viewpoint of dimensional stability, the concentrate compartments preferably contain or are filled with ion-exchange screens.

The liquid passed through the diluate compartment and thereby purified is collected at an outlet of the diluate compartment of the EDI module or apparatus.

Next, the diluate compartment containing the flow-through ion-exchange material according to the present invention will be described in more detail.

The diluate compartment according to the present invention contains at least two blocks, a first block containing anion-exchange material (in the following also called "anion-exchange material block" or simply "AB") and a second block containing cation-exchange material (in the following also called "cation-exchange material block" or simply "CB").

The expression "block", as used herein, denotes a piece of interconnected material having a three-dimensional structure.

A surface of the AB is adjacent to an anion permeable membrane (in the following also simply called "AM") and a surface of the CB is adjacent to a cation permeable membrane (in the following also simply called "CM"). Preferably, the surface of the AB that is adjacent to the AM is in contact with the AM and more preferred the surface of the AB that is adjacent to the AM covers substantially the entire surface of that side of the AM facing the diluate compartment. Likewise, the surface of the CB that is adjacent to the CM is preferably in contact with the CM and more preferred the surface of the CB that is adjacent to the CM covers substantially the entire surface of that side of the CM facing the diluate compartment.

Figure 3:
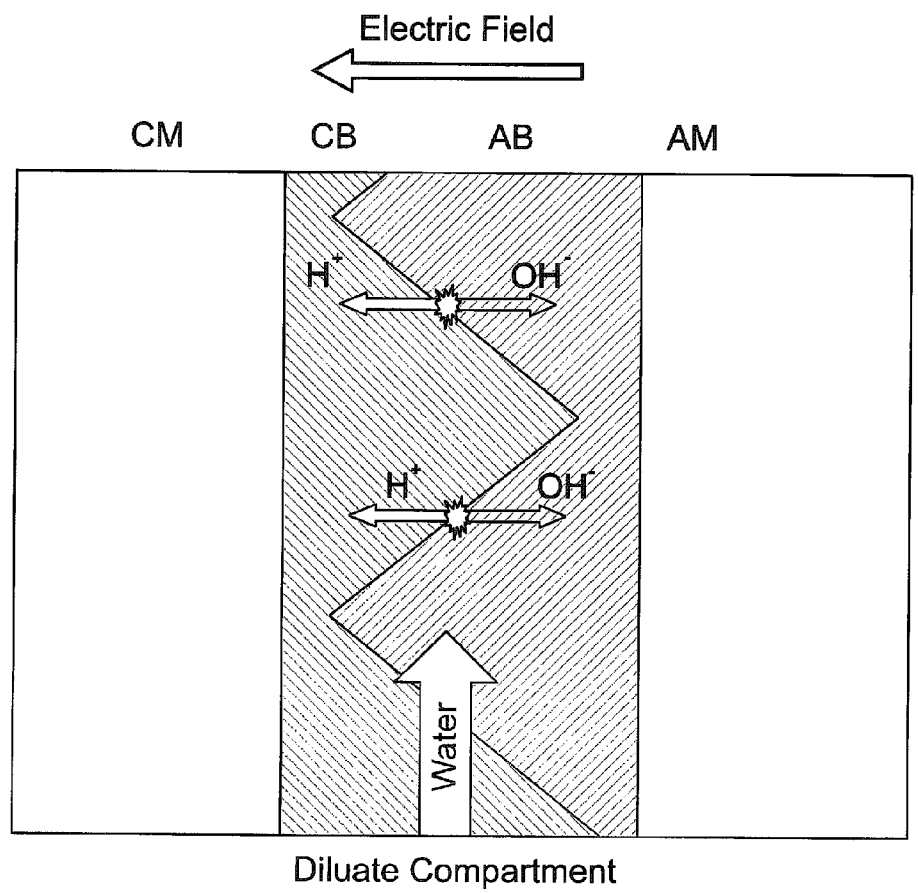
FIG. 3 is a schematic illustration of migration of the ions generated by electrochemically enhanced water dissociation at the ion-exchange material interface in the assembly of the flow-through ion-exchange material according to the present invention under an applied electric field.

The two blocks, AB and CB, are arranged side by side in a liquid-passing direction thereby forming an interface between the two blocks. Preferably, the two blocks, AB and CB, are arranged in such a manner that they are in contact with each other. The expression "liquid-passing direction", as used herein and as the name implies, denotes the main direction of the liquid flow through the diluate compartment. Without wishing to be bound by any theory, the present inventors assume that by the side-by-side arrangement in liquid-passing direction of the blocks, it can be achieved that $H^+$ and $OH^-$ ions generated by electrochemically enhanced water dissociation at the ion-exchange material interface are migrating in opposite directions under application of an electric field without recombining to water. Thus these $H^+$ and $OH^-$ ions are available for the regeneration of the ion-exchange material and can participate in the exchange with ionic and ionizable contaminants from the liquid, thereby improving the purification performance and increasing the current efficiency of the purification process. The mechanism is further illustrated in FIG. 3.

The blocks are arranged in such a manner that the interface between the blocks is spaced apart from the AM and the CM. Without wishing to be bound by any theory, the present inventors assume that the electrochemically enhanced water dissociation exclusively takes place at the interface between the two blocks so that both sorts of generated ions, i.e. $H^+$ and $OH^-$ ions, can regenerate the ion-exchange material and participate in the ion-exchange with ions from the liquid to be purified. It can thereby be prevented that a considerable amount of $H^+$ and $OH^-$ ions generated by electrochemically enhanced water dissociation at an ion-exchange material/membrane interface immediately pass through the corresponding membrane ($H^+$ ion through the cation permeable membrane and $OH^-$ ion through the anion permeable membrane) and are forwarded directly into the respective concentrate compartment (where they recombine) without participating in the regeneration of the ion-exchange material. As a consequence, the current efficiency can be further increased.

A notional straight line in a liquid-passing direction may pass the interface between the two blocks at least one time, preferably at least 5 times, more preferably at least 10 times, still more preferably at least 20 times, still more preferably at least 50 times, most preferably at least 100 times. The upper limit of the number of passages of the notional straight line in a liquid-passing direction through the interface between the two blocks is only limited by the space available and the fine structure of the two blocks. For practical reasons, the upper limit of the number of passages of the notional straight line in a liquid-passing direction through the interface between the two blocks is not more than 1000 times, preferably not more than 500 times. The expression "notional straight line" or simply "straight line", as used herein, denotes a fictional or virtual line that does not exist in reality in the EDI module. Without wishing to be bound by any theory, the present inventors assume that by allowing the liquid flowing through the diluate compartment to pass the interface between anion-exchange material and cation-exchange material at least one time, preferably several times, both cationic and anionic substances will be efficiently removed and completely deionized liquid can be obtained at the outlet of the diluate compartment, thus achieving an excellent purification performance. The angle between the straight line (when passing the interface between the two blocks) and the interface is preferably less than 90°, i.e. the interface is preferably not perpendicular to the liquid-passing direction, more preferably not more than 75°, still more preferably not more than 60°.

The two blocks, AB and CB, may have complementary protrusions and recesses at the interface between the two blocks extending transverse to the liquid-passing direction. The expression "complementary protrusions and recesses", as used herein, means that the two blocks have adjacent surfaces with protrusions (or projections) and recesses (or cavities) complementing each other, i.e. mutually supplying each other's lack or excess. The expression "extending transverse to the liquid-passing direction", as used herein, means that the protrusions and recesses may extend perpendicularly to the liquid-passing direction or may be inclined towards the liquid-passing direction with a slope up to but not including an angle of 90°, preferably up to an angle of 75°, more preferably up to an angle of 60° and most preferably up to an angle of 45°. In other words, the expression "extending transverse to the liquid-passing direction" encompasses every orientation except for an orientation in parallel with the liquid-passing direction. Without wishing to be bound by any theory, the present inventors assume that thereby the liquid flowing through the diluate compartment may pass the anion-exchange material and the cation-exchange material in such a manner that both cationic and anionic substances will be efficiently removed and completely deionized liquid can be obtained at the outlet of the diluate compartment, thus achieving an excellent purification performance. Moreover, the diluate compartment can be completely filled without forming gaps or channels through which the liquid to be purified may pass without sufficient interaction with the ion-exchange material for a satisfactory removal of ions from the liquid. In addition, the contact between the two blocks, AB and CB, can be improved, thereby increasing the stability of the entire assembly.

In a preferred embodiment, the surface of the first block (i.e. the anion-exchange material block), opposite to the surface adjacent to the anion permeable membrane (AM), is complementary to the surface of the second block (i.e. the cation-exchange material block), opposite to the surface adjacent to the cation permeable membrane (CM). Thereby, the purification performance and the avoidance of gaps or channels through which the liquid to be purified may pass without sufficient interaction with the ion-exchange material for a satisfactory removal of ions from the liquid can be further improved.

Preferably, at least part of the interface between the two blocks AB and CB and/or at least part of the complementary surfaces of the two blocks AB and CB is corrugated in a direction transverse to the liquid-passing direction. It is particularly preferred that the part of the interface between the two blocks AB and CB and/or the part of the complementary surfaces of the two blocks AB and CB that is corrugated in a direction transverse to the liquid-passing direction represents at least 20%, more preferably at least 30%, still more preferably at least 40% and most preferably at least 50%, but not more than 98%, more preferably not more than 95%, still more preferably not more than 90% and most preferably not more than 80% of the entire interface or complementary surfaces. The expression "corrugated", as used herein, encompasses the presence of a series of substantially parallel ridges, flanges or fins and furrows, grooves, notches or slots. Thereby, the purification performance and the avoidance of gaps or channels through which the liquid to be purified may pass without sufficient interaction with the ion-exchange material for a satisfactory removal of ions from the liquid can be even further improved. In addition, the contact between the two blocks, AB and CB, can be improved, thereby increasing the stability of the entire assembly.

Figure 4:
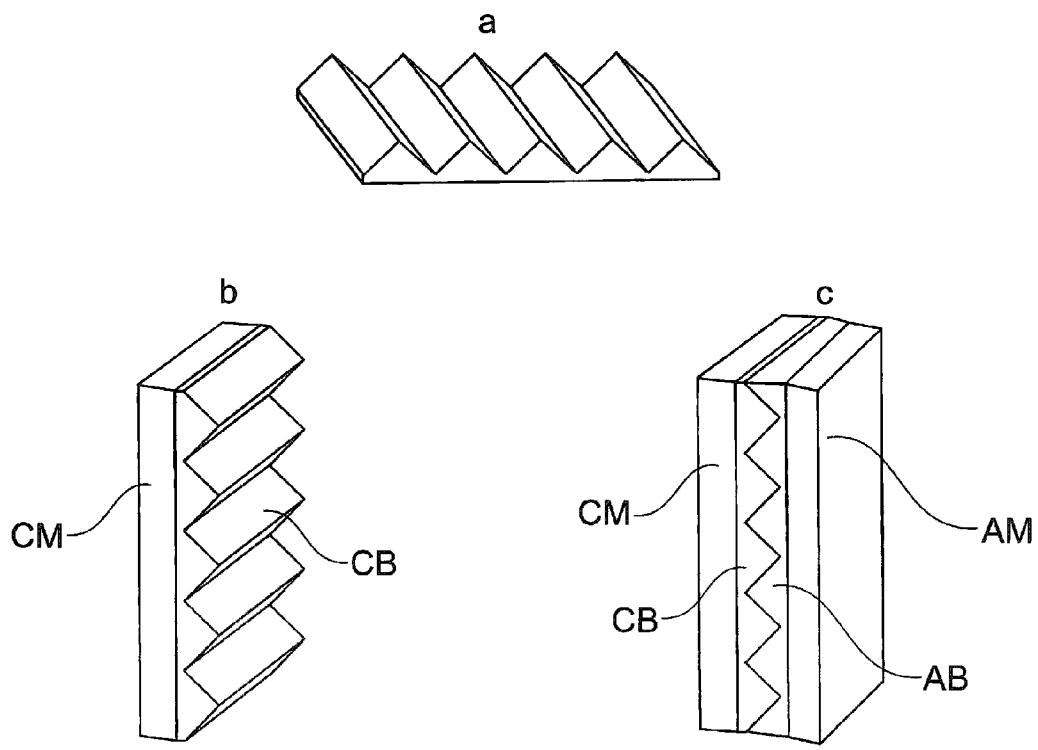
FIG. 4 is a schematic illustration of a preferred example of the shape of the flow-through ion-exchange material according to the present invention (FIG. 4*a*), attached to an ion permeable membrane of the same polarity (FIG. 4*b*) and an assembly of two blocks (CB and AB), attached to the respective ion permeable membranes of the same polarity (CM and AM) (FIG. 4*c*).
Figure 5:
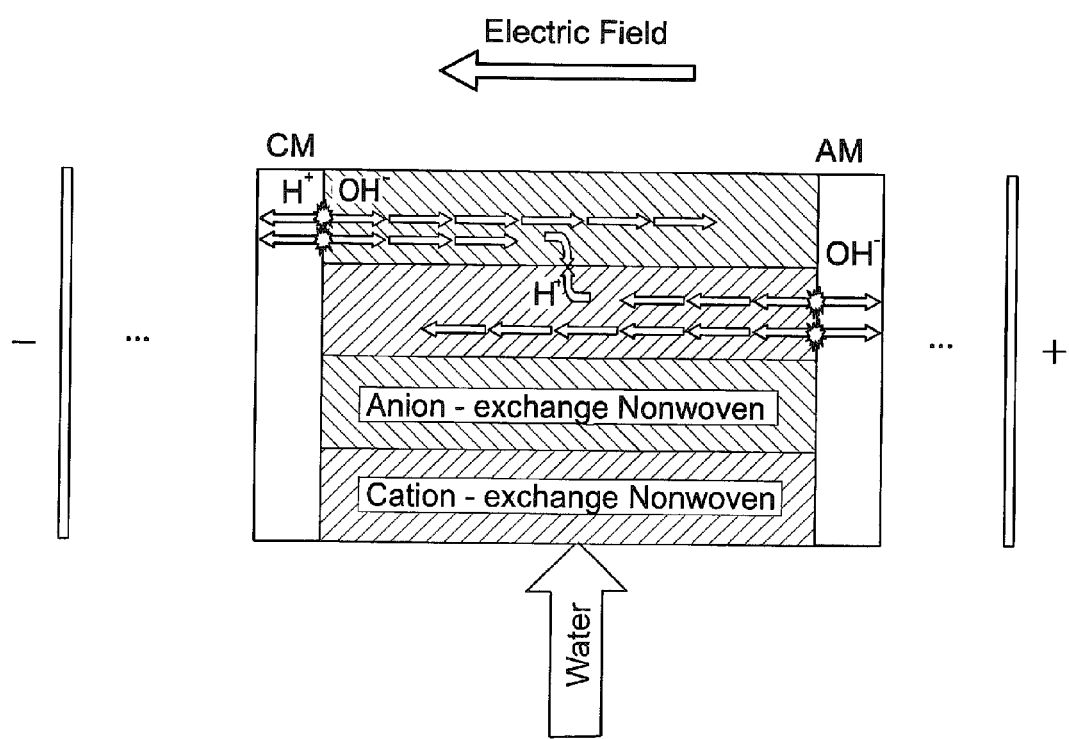
FIG. 5 is a schematic illustration of electrochemically enhanced water dissociation and migration of H$^+$ and OH$^-$ ions inside ion-exchange materials for an element of the materials orientated according to the prior art (US 2006/0091013), where CM and AM denotes cation permeable and anion permeable membrane, respectively.

In a preferred embodiment, at least part of the interface between the two blocks AB and CB and/or at least part of the complementary surfaces of the two blocks AB and CB is wedge-shaped, saw-tooth-shaped or wavy. It is particularly preferred that the part of the interface between the two blocks AB and CB and/or the part of the complementary surfaces of the two blocks AB and CB that is wedge-shaped, saw-tooth-shaped or wavy represents at least 20%, more preferably at least 30%, still more preferably at least 40% and most preferably at least 50%, but not more than 98%, more preferably not more than 95%, still more preferably not more than 90% and most preferably not more than 80% of the entire interface or complementary surfaces. It is particularly preferred that at least part of the interface between the two blocks AB and CB and/or at least part of the complementary surfaces of the two blocks AB and CB, as defined above, has a spiky profile. A variety of spike-angles is possible, such as from 5 to 120°, preferably from 15 to 110°, more preferably from 20 to 100° and most preferably from 30 to 90°. An example of a preferred shape of the flow-through ion-exchange block-like material according to the present invention is illustrated in FIG. 4. By the above particular shape or profile, a good contact between the AB and the CB can be achieved, thereby further improving the purification performance and the avoidance of gaps or channels through which the liquid to be purified may pass without sufficient interaction with the ion-exchange material for a satisfactory removal of ions from the liquid.

The blocks AB and/or CB are preferably made of porous material or fibrous material. It is of course also possible that the block AB is made of porous material and the block CB is made of fibrous material and vice versa. The porous material may be a foam-like material. The fibrous material is preferably a nonwoven fabric. The fibre diameter of the fibrous material is preferably within the range of from 10 to 100 μm, more preferably from 20 to 80 μm.

The flow-through ion-exchange material according to the present invention typically contains a backbone polymer having ion-exchange functionalities grafted thereon.

The ion-exchange functionalities, suitable for use in the present invention, are not particularly limited and any ion-exchange group customary in the field of ion-exchange can be used. For example, a typical weak acid cation-exchange group represents a carboxylic group —$CO_3^-$; a typical strong acid cation-exchange group represents a sulfonic group —$SO_3^-$, e.g.

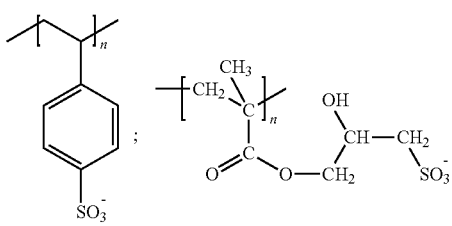

a typical weak base anion-exchange group represents a secondary amino group, such as —N(CH$_3$)H$_2^+$, or a ternary amino group, such as —N(CH$_3$)$_2$H$^+$, e.g.

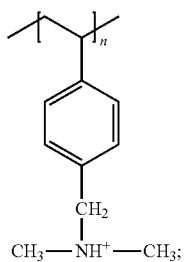

and a typical strong base anion-exchange group represents a quaternary ammonium group, such as —N(CH$_3$)$_3^+$, e.g.

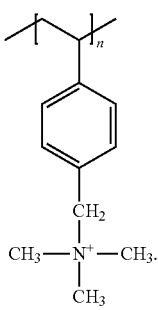

Various backbone polymers can be used for a flow-through ion-exchange material according to the present invention. Suitable examples include polystyrene-divinyl-benzene-copolymer, poly(meth)acrylate, polyethylene, polyvinylidenfluoride, polyurethane, etc.

The synthesis of a strong acid cation-exchange porous block (hereinafter also referred to as "porous cation-exchange resin monolith") is described for instance by Inoue et al., Polymer, Vol. 45 (2004) pp. 3-7. Briefly, the procedure contains the formation of a porous block by polymerization of monomers inside an unstirred water-in-oil emulsion, followed by functionalization with cation-exchange groups. The emulsion of water in the mixture of styrene and divinylbenzene, with addition of an emulsifier and a polymerization initiator was prepared under controlled stirring conditions. Then the stagnant emulsion was cured for polymerization at an elevated temperature in a closed container resulting in a porous block of cross-linked polystyrene-divinylbenzene-copolymer with a fragment of the chemical structure schematically illustrated as follows:

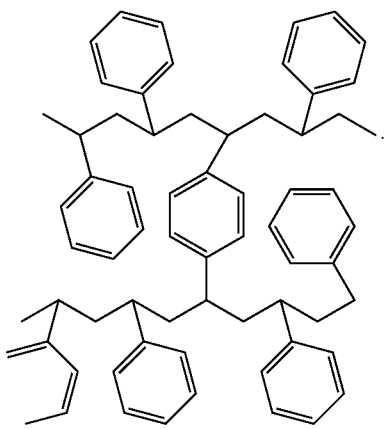 [SMILES: C=C(/C=C\C)C(C)CC(CC(CC(CCc1ccccc1)c1ccccc1)c1ccc(C(CC(CC)c2ccccc2)CC(CC(C)c2ccccc2)c2ccccc2)cc1)c1ccccc1]

After cooling, washing out the residual monomers and drying, the polymer was functionalized by chlorosulfuric acid into strong acid cation-exchange resin in the form of a porous block. After inactivating the residual chlorosulfuric acid, washing and eventual transfer into the required ionic form, the porous block is ready for utilization. Its functional fixed ions are sulfonic acid ions, which are bond to benzene rings of cross-linked polystyrene-divinylbenzene-copolymer polymeric backbone:

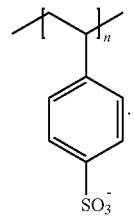

The shape of the porous block replicates the shape of the container used for polymerization. Thus, a specific shape of the porous block, as required for use in the present invention, can be adjusted by the shape of the container used for polymerization.

As an alternative approach, larger blocks can be produced and then cut to the desired shape. For instance, a foam can be prepared from a solution of an ion-exchange polymer in a corresponding organic solvent, while the formation of foam is simultaneously, or followed by cross-linking and evaporation of the solvent. Such foam can be prepared already in the form of the shaped block, or a shape can be given afterwards, e.g. by cutting, calendaring, etc.

The synthesis of ion-exchange porous structures based on polymerization (described for instance in U.S. Pat. No. 5,453,185) or other procedures, such as functionalization of polyurethane foams (described for instance by Yeong et al., J. Appl. Poly. Sci., Vol. 86 (2002) pp. 1773-1781), immobilization of ion-exchange particles (described for instance in U.S. Pat. No. 6,495,014), irradiation initiated grafting and functionalization of polyethylene foam (described for instance in Examples 5 and 6 of U.S. Pat. No. 6,610,546), etc. are well-known state-of-the-art techniques.

Ion-exchange materials in fibrous form can be obtained by grafting and functionalization of a fibrous substrate similar as for porous substrates.

The synthesis of a weak base anion-exchange fibrous nonwoven material is described for instance in Example 1 of U.S. Pat. No. 5,425,866 together with the synthesis of other fibrous ion-exchange materials. A substrate of polypropylene fibre bundles has been irradiated with 200 kGy electron beams in nitrogen and immersed in a solution of chloromethylstyrene for reaction at elevated temperature. After washing and drying, the fibres are treated with a dimethylamine solution at elevated temperature, resulting in weak base anion-exchange material. After washing and eventual transfer into the required ionic form, the fibrous ion-exchange material is ready for utilization.

A typical structure of a fibrous nonwoven commercially available ion-exchange material called FIBAN is shown in Soldatov V. S., Solvent Extraction and Ion Exchange, Vol. 26 (2008) pp. 457-513.

Fibrous materials can be produced as nonwoven fibers or woven spacers with different functionalities. Further suitable methods are described in U.S. Pat. No. 5,308,467, JP 8-12774 A or by Lilja et al., Applied catalysis A, General. Vol. 228 No. 1-2 (2002) pp. 253-267.

The fibrous ion-exchange material, suitable for use in the present invention, can be made on the base of a substrate, which has already the shape, as required for use in the present invention, or it can be shaped after functionalization, for instance by calendering. Taking into account dimensional changes exhibited by materials during ion-exchange functionalization and by changing water content or ionic form, it is preferable that the block is shaped from material in a form corresponding to specific application, e.g. salt-form in equilibrium with pure water. It is also possible to fold, stack and/or press sheets of fibrous woven or nonwoven material in a way that the folds of both ion-exchange materials (i.e. cation-exchange and anion-exchange materials) stack together and create a block that can be placed in the diluate compartment.

In a particularly preferred embodiment, the fibrous ion-exchange material can be brought into the special shape of the flow-through ion-exchange material according to the present invention from a frozen block of a larger dimension. In detail, sheets of nonwoven fibrous ion-exchange materials swollen in water and wet are stacked together, fixed under a certain force (e.g. by putting a weight on the upper plate) and frozen to one block. Alternatively, instead of sheets nonwoven staple fibers could be compressed and frozen to a block in a similar way. This operation is done separately with sheets (or staple fibers) of anion-exchange material and cation-exchange material. The obtained large frozen block is cut into smaller blocks of the desired special shape. Suitable cutting means include water-jet, punches, blades, wire saws, band saws or laser. The blocks of anion- and cation-exchange material can be cut to replicate each other and to fill a diluate compartment completely, further providing a certain compression against the membranes and frame once the complementary structured surfaces of two blocks are put together and the two blocks are placed into the compartment frame between membranes. Thereby, problems due to a certain flexibility and compressibility of fibrous materials can be avoided, facilitating the handling and assembly and enabling a controlled compression, high dimensional precision, low risk of flow channeling and high consistency of the assembly.

It is preferred that the entire flow-through ion-exchange material according to the present invention is provided with ion-exchange functionalities. Thereby the ion-exchange groups at the surface may serve for ion-exchange with the ionic species from the liquid to be purified, while the ion-exchange groups in the interior may serve to accumulate a certain amount of ions and transport them via electromigration inside the material from the diluate compartment to the ion permeable membrane and further into the concentrate compartment.

It is preferable that the porosity, i.e. the resistance to flow, of the AB is similar to the porosity of the CB so that the liquid to be purified will pass through both of them without preference. Thereby, a well-balanced purification performance can be achieved. The porosity suitable for the present invention may be in a very wide range, typically 5-95% and preferably 30-70%. The most suitable porosity depends on the final application and is governed by the maximal allowed pressure drop through the purification compartment, as well as by other characteristics of the flow-through ion-exchange material (e.g. ion-exchange capacity, volume, hardness) and the operating parameters (e.g. concentration of feed water, flow rate, electric current).

It is preferable that the anion-exchange capacity of the AB is similar to the cation-exchange capacity of the CB. It is also preferable that the anion-exchange capacity of the AB is higher than the cation-exchange capacity of the CB, which provides the advantages of improving the purification efficiency for liquids having a pH below 7 and of improving the removal of weakly dissociated compounds that are typically weak acids rather than weak bases, such as carbon dioxide, silicic acid or boric acid. However, if the ion-exchange capacity per volume of the anion-exchange material is not higher or equal to that of the cation-exchange material, then the balance of ion-exchange groups present in a diluate compartment could be achieved by selecting a shape of blocks with a volume of the anion-exchange material larger than that of the cation-exchange material as exemplarily illustrated in FIGS. 1 and 2.

The ion-exchange capacity is preferably as high as possible for a given material. Typically, the ion-exchange capacity of grafted ion-exchange materials can be increased by a stronger irradiation and/or a longer exposure to the grafting, cross-linking and functionalizing chemicals. However, at a certain degree of the ion-exchange capacity, the swelling of the ion-exchange material in water (i.e. water uptake) would become too strong (up to a partial or complete dissolution) resulting in a lowered mechanical stability. Accordingly, the degree of functionalization and cross-linking is governed by a trade-off between the ion-exchange capacity and the mechanical stability. In view of the excellent purification performance due the special shape and orientation of the flow-through ion-exchange material inside the diluate compartment of an EDI module according to the present invention, it is possible to solve the above trade-off because a sufficient purification can already be achieved even with a lower ion-exchange capacity of the flow-through ion-exchange material compared with the ion-exchange material typically used in conventional EDI modules.

The thickness of the diluate compartment is not particularly limited, but a thicker compartment is advantageous for reducing the material costs for the module. A preferred thickness is from 3 mm to 5 cm, more preferably from 5 mm to 3 cm and most preferably about 1 cm. According to the present invention, it is possible to use thicker compartments than in conventional EDI modules with a mixed bed of ion-exchange material so that the number of compartments and membranes required in one stack is reduced and thus the material and assembly cost can be decreased.

In a preferred embodiment, the EDI module according to the present invention further comprises at least one fastening means in order to maintain good contact between two ion-exchange blocks, but also the contact between block/membrane and block/frame to thereby provide a continuous conduction of ions through the ion-exchange media and to prevent flow channeling in the compartment. Suitable fastening means to provide good contact between the materials and to eliminate a channeling risk include (i) a spring to keep sufficient compression on the ion-exchange blocks; (ii) the use of ion-exchange blocks with a certain flexibility/elasticity; (iii) the use of a hard spacer, such as a net-like screen, in the concentrate compartment to fix the position of the membranes and prevent their deformation into the concentrate compartment, (iv) to use one or more frames encompassing the EDI module and covered with special material, e.g. overmolded with elastomer; and/or (v) to provide a good junction between the frame and the ion-exchange blocks, etc. Any one of the above fastening means (i) to (v) might be used as well as any combinations thereof.

In a particularly preferred embodiment, the EDI module according to the present invention further comprises one or more diluate compartments containing or preferably filled with ion-exchange resin beads. While porous or fibrous ion-exchange materials, as preferably used according to the present invention, with highly developed surface have the advantages of an enhanced kinetic of ion-exchange and a superior purification performance compared to conventional ion-exchange resin beads, their use in practical applications is often opposed by higher cost of the porous or fibrous materials and a higher energy consumptions of EDI. Moreover, since the ion-exchange capacity of porous or fibrous nonwoven ion-exchange materials is typically inferior to that of conventional ion-exchange resins, the use of such materials is more economical when fed by water with relatively low charge of ionic and ionizable contaminants, such as pre-purified water.

A combination of diluate compartments filled with ion-exchange resins typically in the form of beads and compartments with porous or fibrous ion-exchange material, as preferably used according to the present invention, in one electrodeionization module makes use of the advantages of both materials properties, in that most of the contaminants can be removed in diluate compartments filled with ion-exchange resin beads and then this pre-purified water can pass through a diluate compartment containing porous or fibrous ion-exchange material to be purified to ultra-pure water quality. Thereby, an EDI module can be obtained having excellent purification performance and superior ion-exchange capacity at reasonable costs.

The one or more diluate compartments filled with ion-exchange resin beads can be for instance of a mixed-bed type (thin cell), layered beds or separated beds. Combinations thereof are also possible. From a viewpoint of further decreasing the manufacturing cost of the EDI module and increasing the reliability of the manufacturing and the module performance, the one or more diluate compartments filled with ion-exchange resin beads is preferably organized in a thick cell.

Figure 6:
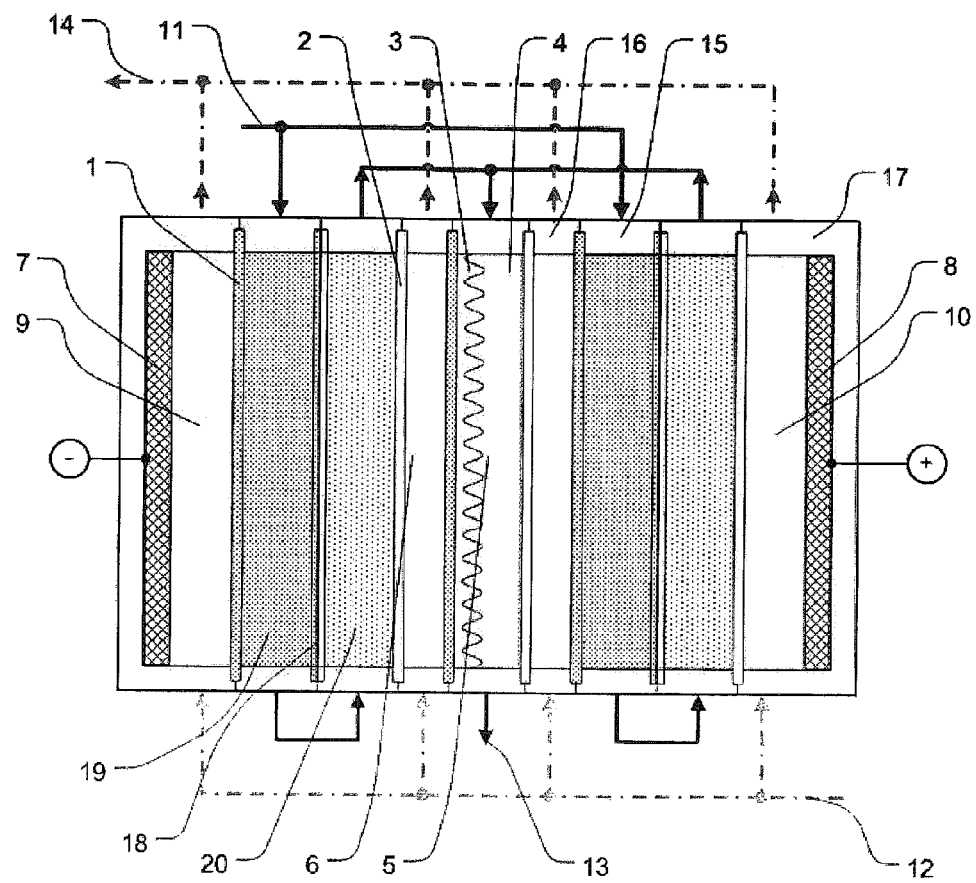
FIG. 6 is a schematic illustration of a preferred embodiment of an EDI module according to the present invention.

An example of this particularly preferred embodiment is shown in FIG. 6 as an EDI module combining thick-cell diluate compartments filled with separated beds of ion-exchange resins and a porous or fibrous ion-exchange material. The EDI module comprises three deionization units, while two are filled by ion-exchange resins and one by cation- and anion-exchange flow-through blocks according to the present invention. Separated beds of diluate compartments consist of cation-exchange resin (19) between cation-exchange membrane (1) and bipolar membrane (18) and anion-exchange resin (20) between bipolar membrane (18) and anion-exchange membrane (2).

The stack is accomplished on the extremities by the cathode compartment (9) containing the cathode (7) and by the anode compartment (10) containing the anode (8). Perimeter, sealing and inlet-outlet flow distributors for corresponding compartments are formed by diluate compartment frames (15), concentrate compartment frames (16), cathode and anode end-caps (17).

The feed flow (11) enters the diluate compartments with the cation-exchange resin bed (19) where the majority of cationic species is removed, then passes through the diluate compartments with anion-exchange resin bed (20) where the majority of anionic species is removed and subsequently flows through the diluate compartment (5) filled with cation-exchange flow-through block (3) and anion-exchange flow-through block (4) according to present invention for subsequent removal of residual species, i.e. final purification, producing diluate stream (13). The stream (12) rinses the concentrate (6) and electrode (9 and 10) compartments exiting as concentrate (14).

While the electrodes, i.e. the cathode and the anode, suitable for use in the present invention, as stated above are not particularly limited and any material and size customary in the field of EDI modules can be used, in a preferred embodiment the electrodes are flow-through electrodes. In a further preferred embodiment, the cathode is made from nonwoven or woven fibers made of carbon or metal.

The electrode compartments, i.e. the anode and the cathode compartments, of an EDI module according to the present invention can function as diluate compartments or concentrate compartments. Also different materials can be used as an electrode and as filler for the electrode compartment. In order to prevent a risk of carbonate scaling and oxidation of materials, as well as to reduce energy consumption it is preferred to use a cation-exchange open-mesh fiber screen adjacent to the anode and/or an anion-exchange open-mesh fiber screen adjacent to the cathode. The use of a flow-through electrode, such as an expanded mesh, woven-wire net, metal-foam, sintered steel, etc., is preferred from a viewpoint of simplifying the evacuation of gases generated at the electrodes and reducing an overall voltage drop on the module. As known in the art, such a flow-through electrode can be spaced apart from the closest membrane or stay in direct contact with the membrane. As an illustrative example it can be considered a perforated plate electrode juxtaposed against the membrane with a woven spacer net between the backside of the perforated plate electrode and the end-cap. A further example is a woven metal wire electrode sandwiched between the membrane and vertical rips of the end-cap.

The use of a cathode made from nonwoven or woven fibers made of carbon or metal is advantageous in terms of a reduction of a local pH increase and a risk of carbonate scaling on the cathode, in particular if the cathode compartment functions as a concentrate compartment and ions of high hardness are present in water. Thus, the cathode preferably comprises a block of well rinsed flow-through nonwoven or woven fibers or a porous monolith made of metal or carbon. Such materials are commercially available from CarboPur technologies Inc. (Montreal, Canada), SNC Corporation (Bucheon, South Korea), Recemat International (Oud-Beijerland, The Netherlands) and others.

Another advantage of using such nonwoven fibrous electrodes with highly developed specific surface can be found by rinsing two electrode compartments in series, while a gas produced at one electrode can be absorbed and oxidized/reduced at the opposite electrode. Thereby, the volume of gas generated in the downstream electrode compartment can be reduced and the volume of an explosive gas mixture, such as oxyhydrogen, exiting the module can be reduced.

Compared to conventional EDI with ion-exchange resin beads, the EDI module according to the present invention is generally characterized by a relatively short purification path, which is due to the better kinetic of the porous or fibrous ion-exchange materials, as preferably used according to the present invention, having a larger specific surface. However, a shorter purification path and the relative compactness of the EDI module according to the present invention tends to result in proportionally higher current densities as well as higher voltages applied on the electrodes, which might lead to secondary effects of an intensive gas generation and heating of the electrodes.

The gases generated at the electrodes (mainly $H_2$ at the cathode and $O_2$ at the anode) can have a negative effect on the current conduction and may create a preferential flow channeling and insufficiently rinsed zones in the electrode compartment. These effects can have an impact on the current density distribution as well as a scaling risk and subsequently on the purification performance, energy consumption and life-time of the module. Even worse, the presence of gaseous $H_2$ together with $O_2$ in the same waste-stream or in a tank, e.g. by feed-and-bleed recirculation of both electrode rinsing streams, or by recycling them in a tank upstream RO, poses a risk of explosion.

Thus a removal of gases from the electrode compartments and from the module is desired.

In a further preferred embodiment, the electrodes are configured to enable degassing. In particular, the EDI module according to the present invention preferably comprises one or more degassing compartments, most preferably a degassing compartment for each electrode.

A measure to degas the electrode compartments is to use a layer of hydrophobic porous or fibrous material with pores that allow passage of gases, but are sufficiently fine to stay impermeable for electrode-rinsing water at the pressure drop existing during the operation, while applying a vacuum or a stripping gas flow on the opposite side of the porous hydrophobic layer. Suitable porous hydrophobic layers, or membranes, are available from different manufacturers, like FluoroTechniques Membrane Products Inc. (Castleton On Hudson, N.Y., USA); or Membrana (Charlotte, N.C., USA). For this degassing solution the use of a perforated or mesh flow-through electrode is preferable, whereby the electrode compartment will be delimited by the ion permeable membrane from one side and by the gas permeable membrane (hydrophobic porous layer) from the other side. The electrode can be in direct contact with the hydrophobic porous layer and with the ion permeable membrane as well.

A degassing compartment is preferably incorporated into the module end-cap and filled by a neutral open-mesh fabric, or formed by protrudings, e.g. rips, in the end-cap delimiting the position of the hydrophobic layer, but allowing the passage of gas.

A vacuum in the degassing compartment can be created by connecting it to an eductor installed on a water-jet of RO-reject water usually available in a water purification system. The eductor element can be installed externally and connected with the degassing compartment via tubes, or it can be a part incorporated in the end-cap.

Vacuum connected to one end of the degassing compartment while an opposite end connected to atmosphere may create an air-sweeping, which might serve for better degassing and might also serve for cooling and also for a reduction of explosion risk, since $H_2$ will be strongly diluted with air inside the degassing compartment.

For example, an eductor can be installed on the RO-reject side and connected to the degassing compartment of the cathode positioned horizontally with the degassing compartment on top of the cathode, thereby evacuating $H_2$ into the waste stream of the system, while the anode-rinse water containing $O_2$ can be recycled together with bubble-free cathode-rinse water into a tank upstream RO, thus preventing the explosion risk.

In addition to the advantages described above, the degassing in the module further allows the use of recovered electrode rinse water in other compartments, which would be hindered due to the undesired excess of gasses. When using an internal degassing compartment, bubble-free water from the electrode compartment can be directly diverted, e.g. through a trunk inside the housing of the module into another compartment.

Figure 7:
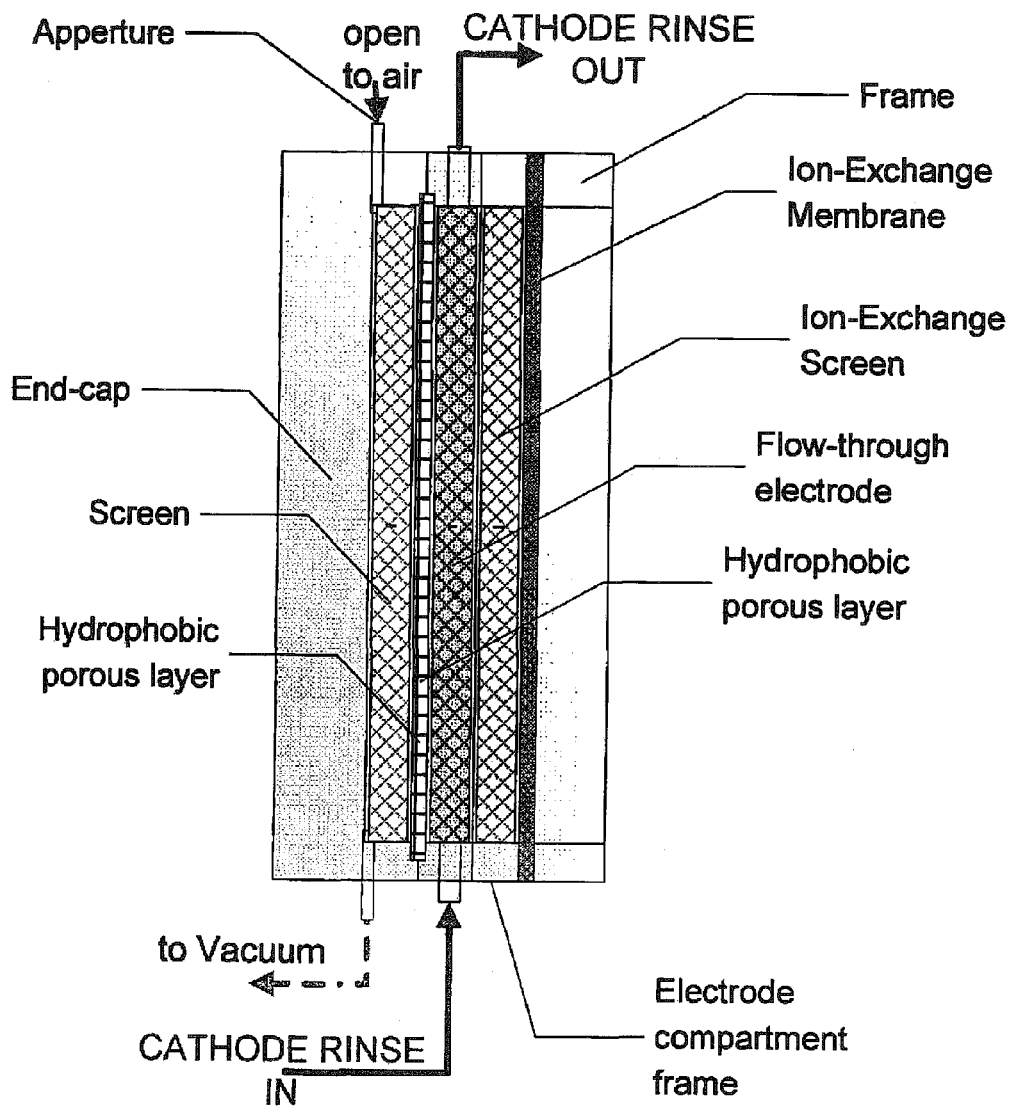
FIG. 7 is a schematic illustration of a preferred cathode arrangement of an EDI module according to the present invention.

A schematic illustration of a preferred cathode arrangement enabling a degassing inside the electrode end-cap as described above is shown in FIG. 7.

An example of one advantageous configuration is an EDI anode compartment filled by cation-exchange material and bounded by a cation permeable membrane and mesh-type anode with a hydrophobic layer and a degassing compartment on its back-side, while the water passing the anode compartment is decationized and acidified through ion-exchange, then free of gas bubbles diverted to rinse the cathode and/or concentrate compartments, in series or in parallel.

$H_2$ and $O_2$ gases removed from the electrode compartments can be used to feed a fuel cell thereby partially recovering energy. However for doing so, the gasses should be sufficiently pure, since a fuel cell element is very sensitive to potential contaminants, like $CO_2$ and $Cl_2$. For this purpose, it is therefore preferred that the electrode compartments function as partial deionization compartments and are fed with pure water, e.g. a part of the produced diluate. Alternatively, the collected gaseous mixture containing H2 and O2 can be directed to a "recombination" chamber, containing for instance a Pt-catalyst, where H2 will be flameless oxidized to water, thus reducing an explosion risk. Further suitable catalysts are disclosed in EP 0 358 912 B1 and a suitable catalyst arrangement is disclosed in EP 0 416 140 B1.

As stated above, the electrodes of an EDI module according to the present invention tend to be heated. A significant heating of the electrodes, because of conducted electricity and insufficient cooling by the electrode rinse water, can lead to a degradation of module materials, in particular of the ion-exchange materials, and is therefore not desired.

In order to cool the electrodes and prevent potential damages, the end-cap can be provided with cooling jackets, i.e. voids wherein water with temperature lower than that of the corresponding electrode flows. Such voids located in the end-cap on the back-side of the electrode are isolated from an exchange of matter with electrode compartment and only heat exchange can take place. Preferably, the water used for cooling is already available in the water purification system, e.g. water from any intermediate purification step upstream RO, or RO-permeate before entering into EDI diluate compartment.

The EDI module according to the present invention can be used in an EDI apparatus for production of high-purity or ultrapure water, such as having a resistivity of at least 18.2 $M\Omega \cdot cm$ at 25° C.

The EDI module or the EDI apparatus according to the present invention can also be used in a laboratory water purification system.

In a first embodiment of the laboratory water purification system according to the present invention, water after pretreatment and reverse osmosis (RO) purification is collected in a tank.

The EDI module or the EDI apparatus according to the present invention (in the following also simply called EDI module) is located downstream the tank and can be operated in two modes:
1) regeneration—recirculation of water between the tank and the EDI module while water in the tank is purified to a set level and the ion-exchange materials of the module are transformed in substantially regenerated form;
2) dispensing—water from the tank is pumped through the EDI module and produced pure or ultrapure water is used at flow rate of dispensing.

Preferably, the RO-permeate enters the tank from the top, while an increase of interface water/air, e.g. using spray ball or aerator, will intensify the release of $CO_2$ from water oversaturated with $CO_2$. Such partial degassing would facilitate the work of the downstream EDI module.

During the regeneration mode, the EDI module can be operated at relatively low flow rates, and at a current sufficiently high to substantially regenerate the ion-exchange materials between subsequent dispensing. The water in the tank can be purified to a conductivity of ca. 1 µS/cm. Purification to a lower conductivity is less reasonable because the water stored in the tank can be deteriorated through the contact with air, such as by $CO_2$ absorption. An advantage of using porous or fibrous ion-exchange material, as preferably used according to the present invention, compared to resin beads lies in the enhanced ion-exchange kinetic, i.e. the ability to purify water in a relatively short path length at relatively high flow velocity. Thus a compact EDI module can treat water at a high flow rate without creating high pressure drop. This advantage is used during the dispensing, when pre-purified water from the tank is finally purified to a high degree, e.g. ultrapure water, and directly dispensed for use in a final application.

Preferably, but not necessarily an electric current is conducted through the EDI module in the dispensing mode. Nevertheless, the ion-exchange materials can be partially transformed into salt ionic form, then regenerated again once dispensing is stopped and the system is switched to the regeneration mode.

This embodiment allows the production of high-purity water with a relatively compact EDI module and without an additional downstream purifying means.

Figure 8:
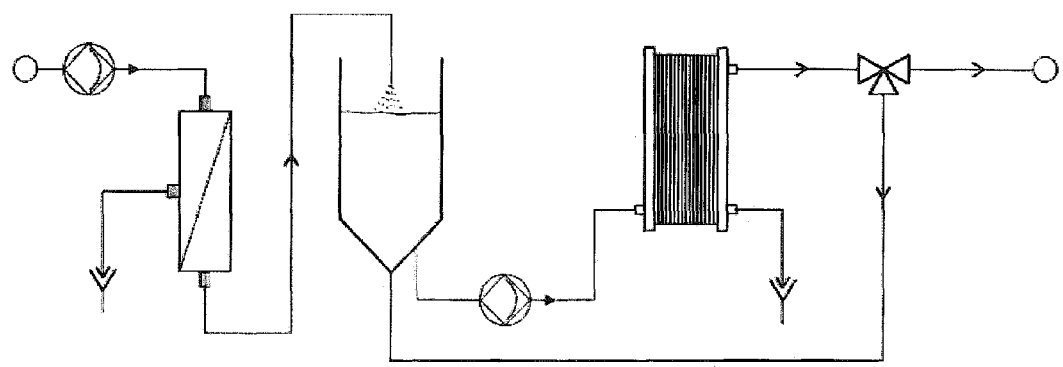
FIG. 8 is a schematic illustration of an exemplary (first) embodiment of a laboratory water purification system according to the present invention.

An example of this embodiment is schematically illustrated in FIG. 8. Here a part of the laboratory water purification system utilizing an EDI module according to the present invention is shown working in two regimes: Water after pre-treatment passes RO-purification step; the produced permeate is fed into a tank; recirculation of water from the tank through the EDI module working in the regeneration regime purifies the water to a set level; in the production (dispensing) regime the recirculation is stopped and the produced EDI-diluate is delivered to the point of use at a desired flow rate.

In a second embodiment of the laboratory water purification system according to the present invention, the water purification system comprises mainly pretreatment, RO or NF (nanofiltration) and the EDI modules according to the present invention without any intermediate water storage tank for the EDI diluate.

The water produced by this system can be directly supplied to the point of use with only an optional purifier downstream the EDI module. This laboratory water purification system is advantageous to currently known systems, since it requires less components.

Figure 9:
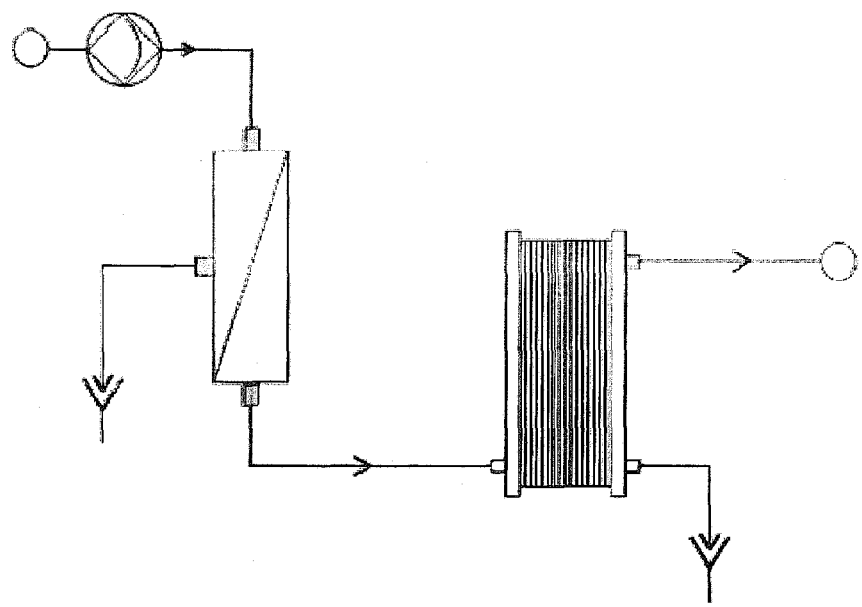
FIG. 9 is a schematic illustration of another exemplary (second) embodiment of a laboratory water purification system according to the present invention.

An example of this embodiment is schematically illustrated in FIG. 9. Here a part of the laboratory water purification system utilizing an EDI module according to the present invention is shown where the RO and EDI purification steps are designed to deliver water to the point of use with sufficient flow rate without an intermediate storage reservoir.

In a third embodiment of the laboratory water purification system according to the present invention, the laboratory water purification system contains an EDI module according to the present invention and comprises an RO-step upstream the EDI module, wherein by switching from a production to a stand-by mode a part of the water produced by EDI or by RO is diverted to the inlet of the RO to perform an RO-flush.

During a stand-by period, an exchange of ions between the permeate and the reject side of an RO-membrane occurs, which leads to a contamination of the permeate side when tap water or water with a high ionic load is used as feed. Conventionally, a certain rinsing time (typically from some seconds to few minutes) is required to rinse out the thus contaminated water from the permeate side and then divert the permeate of a sufficient low conductivity for downstream EDI-purification. In order to avoid this rinsing and to start the production once required the laboratory water purification system of this embodiment rinses the RO-cartridge with purified water (RO-permeate or EDI-diluate) in the end of each product cycle prior to stand-by. Compared to prior art the laboratory water purification system of this embodiment allows an immediate start of the production on demand, so that in case of sizing RO and EDI to produce a flow rate required for dispensing, an intermediate storage-tank for the EDI-diluate can be avoided, which reduces the size and the cost of the water purification system.

Figure 10A:
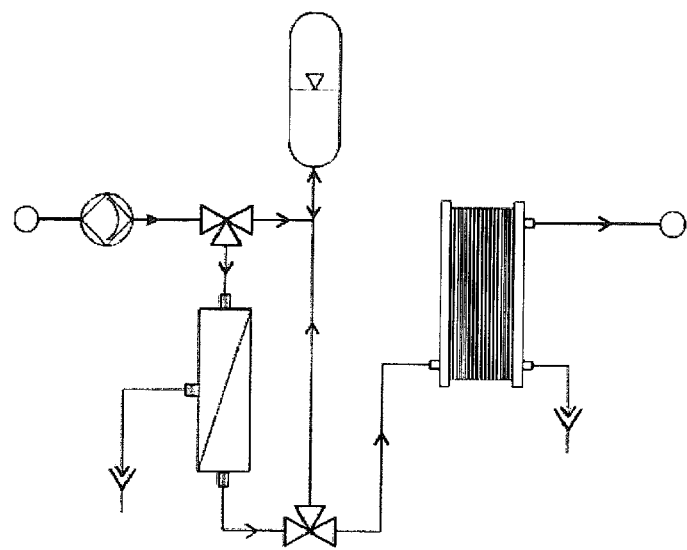
FIGS. 10*a* and 10*b* are schematic illustrations of another exemplary (third) embodiment of a laboratory water purification system according to the present invention.
Figure 10B:
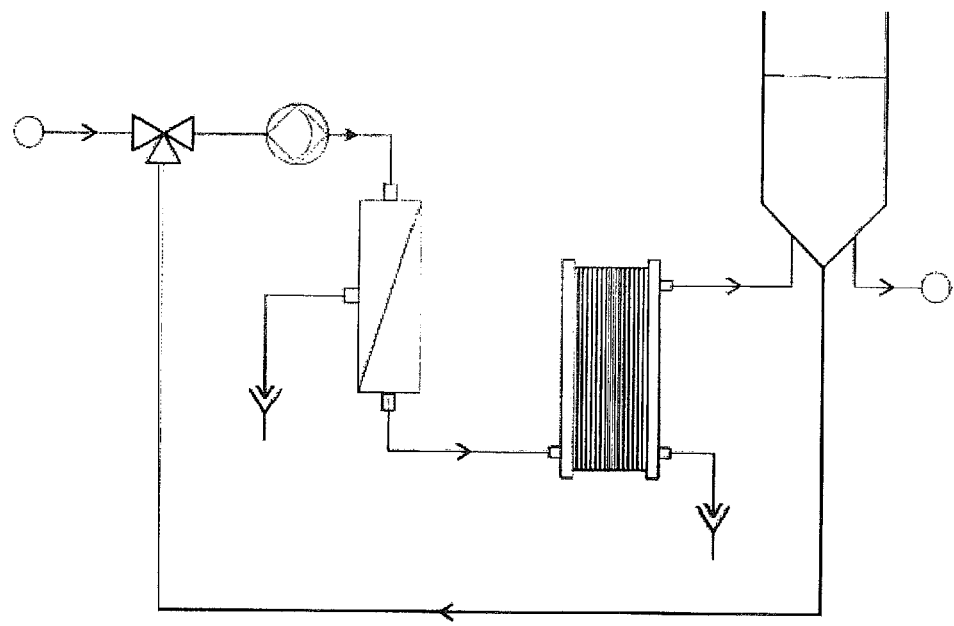

An example of this embodiment is schematically illustrated in FIGS. 10a and 10b wherein purified water is flushed through the reject side of the RO-cartridge prior to the stand-by period:

FIG. 10a shows an illustrative example of using RO-permeate: During the operation RO-permeate passes to the EDI step; before going to stand-by the EDI stops, while the RO-permeate is diverted to fill a bladder tank, then the RO stops (pump off) and water under pressure of the bladder tank is diverted to flush the feed-reject side of RO.

FIG. 10b shows an illustrative example of using EDI-diluate: The system contains a tank to store EDI-diluate and before going to stand-by a certain volume from the tank is pumped through the RO-cartridge.

In addition to the above described elements, other elements can be added in a water purification chain, which would depend on the respective application. For example, the installation of a UV-lamp on the RO-permeate upstream the EDI can further improve the removal of organic contaminants.

The water used for the pre-stand-by flush needs to be significantly purer than RO-feed. Thus RO-permeate, EDI-diluate or other water sources of similar quality could be used, what even might have additional advantages for certain applications.

The required volume of water for flush can be collected during the production step from the EDI-waste stream or rinse of some compartments, e.g. anode compartments or cathode compartments. Once the system switches to stand-by, this collected water can be flushed through the feed-reject side of the RO. This embodiment can be advantageous in certain configurations. For example, the water from the anode compartment of an EDI is usually acidified and its use for RO-flush might help to dissolve possible carbonate scaling from RO-membranes. The presence of oxidants in the electrode rinse streams can prevent the occurrence of bio-fouling in the RO-cartridge, etc.

While the present invention has been described in detail by way of specific embodiments and examples, the invention is not limited thereto and various alterations or modifications are possible, without departing from the scope of the invention.

LIST OF REFERENCE SIGNS

1: cation permeable membrane
2: anion permeable membrane
3: cation-exchange block
4: anion-exchange block
5: diluate compartment
6: concentrate compartment
7: cathode
8: anode
9: cathode compartment
10: anode compartment
11: feed to deionize
12: feed to concentrate
13: diluate
14: concentrate
15: frame of diluate compartment
16: frame of concentrate compartment
17: end cap
18: bipolar membrane
19: cation-exchange resin
20: anion-exchange resin

The invention claimed is:

1. An electrodeionization (EDI) module comprising a cathode (7) and an anode (8) spaced apart from the cathode (7), having therebetween at least two ion permeable membranes comprising at least one anion permeable membrane (2) and at least one cation permeable membrane (1) and delimiting one or more diluate compartments (5) and one or more concentrate compartments (6), wherein at least one diluate compartment (5) contains at least two blocks (4, 3), a first block (4) containing anion-exchange material and a second block (3) containing cation-exchange material wherein a surface of said first block (4) is adjacent to an anion permeable membrane (2) and a surface of said second block (3) is adjacent to a cation permeable membrane (1), and wherein said first and second blocks (4, 3) have complementary protrusions and recesses and are arranged side by side and in direct contact with each other with said complementary protrusions and recesses forming an interface between said first and second blocks (4, 3), wherein said at least one diluate compartment (5) is completely filled with said first and second blocks (4, 3), without forming gaps or channels, wherein said interface extends transverse to a liquid-passing direction through said at least one diluate compartment (5), wherein said interface is spaced apart from said anion permeable membrane (2) and said cation permeable membrane, (1) and wherein said interface is formed such that a straight line in the liquid-passing direction crosses the interface at least one time.

2. The EDI module according to claim 1, wherein at least part of said interface between said first and second blocks (4, 3) is corrugated in a direction transverse to the liquid-passing direction.

3. The EDI module according to claim 1, wherein a surface of said first block (4), opposite to the surface adjacent to the anion permeable membrane (2), is complementary to a surface of said second block (3), opposite to the surface adjacent to the cation permeable membrane (1).

4. The EDI module according to claim 3, wherein at least part of the complementary protrusions and recesses of said first and second blocks (4, 3) is corrugated in a direction transverse to the liquid-passing direction.

5. The EDI module according to claim 1, wherein at least part of said complementary protrusions and recesses of said first and second blocks (4, 3) is wedge-shaped, saw-tooth-shaped or wavy.

6. The EDI module according to claim 1, wherein said first and second blocks (4, 3) comprise or are made of porous material or fibrous material.

7. The EDI module according to claim 1, wherein the porosity of said first block (4) is similar to the porosity of said second block (3).

8. The EDI module according to claim 1, wherein the anion-exchange capacity of said first block (4) is similar to or higher than the cation-exchange capacity of said second block (3).

9. The EDI module according to claim 1, wherein said at least one anion permeable membrane (2) is an anion-exchange membrane and said at least one cation permeable membrane (1) is a cation-exchange membrane.

10. The EDI module according to claim 1, further comprising at least one fastening means.

11. The EDI module according to claim 1, further comprising one or more further diluate compartment(s) (5) filled with ion-exchange resin beads.

12. An electrodeionization (EDI) apparatus for production of high-purity water or for production of ultra-pure water, comprising an EDI module as defined in claim 1.

13. A laboratory water purification system, comprising an EDI module as defined in claim 1.

14. A method for purifying a liquid utilizing an EDI module as defined in claim 1, the method comprising the steps of feeding the liquid to be purified into said at least one diluate compartment (5), passing the liquid to be purified through said at least one diluate compartment (5) in the liquid-passing direction under application of an electric field, and collecting the purified liquid at an outlet of said at least one diluate compartment (5).

* * * * *